(12) United States Patent
Rabin et al.

(10) Patent No.: US 11,156,284 B2
(45) Date of Patent: Oct. 26, 2021

(54) SELF-ALIGNING CAM FOLLOWER ROLLER DEVICE

(71) Applicant: Aktiebolaget SKF, Gothenburg (SE)

(72) Inventors: Michel Rabin, Monterfil (FR); Charles Chambonneau, Ballan Miré (FR); Mickael Chollet, Joué-lès-Tours (FR); Benoît Hauvespre, Saint Etienne de Chigny (FR); Thomas Perrotin, Saint Roch (FR); Mathieu Thibault, Le Sappey-en-Chartreuse (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 526 days.

(21) Appl. No.: 16/026,744

(22) Filed: Jul. 3, 2018

(65) Prior Publication Data
US 2019/0024773 A1    Jan. 24, 2019

(30) Foreign Application Priority Data

Jul. 20, 2017 (DE) .......................... 102017212521.7

(51) Int. Cl.
| | |
|---|---|
| F16H 53/06 | (2006.01) |
| F04B 9/04 | (2006.01) |
| F04B 1/0439 | (2020.01) |
| F04B 53/00 | (2006.01) |
| F01L 1/14 | (2006.01) |
| F02M 59/10 | (2006.01) |

(52) U.S. Cl.
CPC ................ F16H 53/06 (2013.01); F01L 1/14 (2013.01); F02M 59/102 (2013.01); F04B 1/0439 (2013.01); F04B 9/042 (2013.01); F04B 53/00 (2013.01); *F01L 2305/00* (2020.05); *F01L 2305/02* (2020.05)

(58) Field of Classification Search
CPC ......... F16H 53/06; F02M 59/102; F01L 1/14; F01L 1/143; Y10T 74/2107
See application file for complete search history.

(56) References Cited

U.S. PATENT DOCUMENTS

| | | | |
|---|---|---|---|
| 9,032,863 B2 * | 5/2015 | Chambonneau | F16H 53/06 |
| | | | 92/129 |
| 9,885,330 B1 * | 2/2018 | Xu | F04B 9/042 |

(Continued)

FOREIGN PATENT DOCUMENTS

| | | |
|---|---|---|
| CN | 201539371 U | 8/2010 |
| DE | 102009056304 A1 | 6/2011 |

(Continued)

*Primary Examiner* — Luis A Gonzalez
(74) *Attorney, Agent, or Firm* — Garcia-Zamor Intellectual Property Law; Ruy Garcia-Zamor; Bryan Peckjian

(57) ABSTRACT

A cam follower roller device including a tappet body extending along a longitudinal axis and defining a tappet bore, a pin centered on a transverse axis, through holes having mounting ends for supporting the pin on the tappet body, and a roller rotatably mounted on the pin around the transverse axis, the roller having a cylindrical outer surface, a central cylindrical bore and two frontal end faces. Transverse gaps are provided between frontal end faces of the roller and the tappet bore, and the central cylindrical bore of the roller is mounted around an annular rolling surface of transverse convex profile.

6 Claims, 3 Drawing Sheets

(56) References Cited

U.S. PATENT DOCUMENTS

| | | | |
|---|---|---|---|
| 2016/0160986 A1* | 6/2016 | Berruet | F16H 53/06 74/569 |
| 2017/0130616 A1* | 5/2017 | Viault | F02M 59/102 |
| 2017/0145869 A1* | 5/2017 | Corbett | F16H 53/06 |
| 2018/0119732 A1* | 5/2018 | Viault | F16H 53/06 |

FOREIGN PATENT DOCUMENTS

| | | | | |
|---|---|---|---|---|
| DE | 102016207679 A1 * | 11/2017 | | F16H 53/06 |
| DE | 102016207682 A1 * | 11/2017 | | F16H 53/06 |
| EP | 1876329 A2 | 1/2008 | | |
| EP | 3121436 A1 * | 1/2017 | | F01L 1/14 |
| JP | 08296412 A * | 11/1996 | | |
| JP | 11247845 A * | 9/1999 | | |
| JP | 2002106309 A | 4/2002 | | |
| JP | 2004225551 A | 8/2004 | | |
| JP | 2007120591 A | 5/2007 | | |
| JP | 2015090168 A | 5/2015 | | |

* cited by examiner

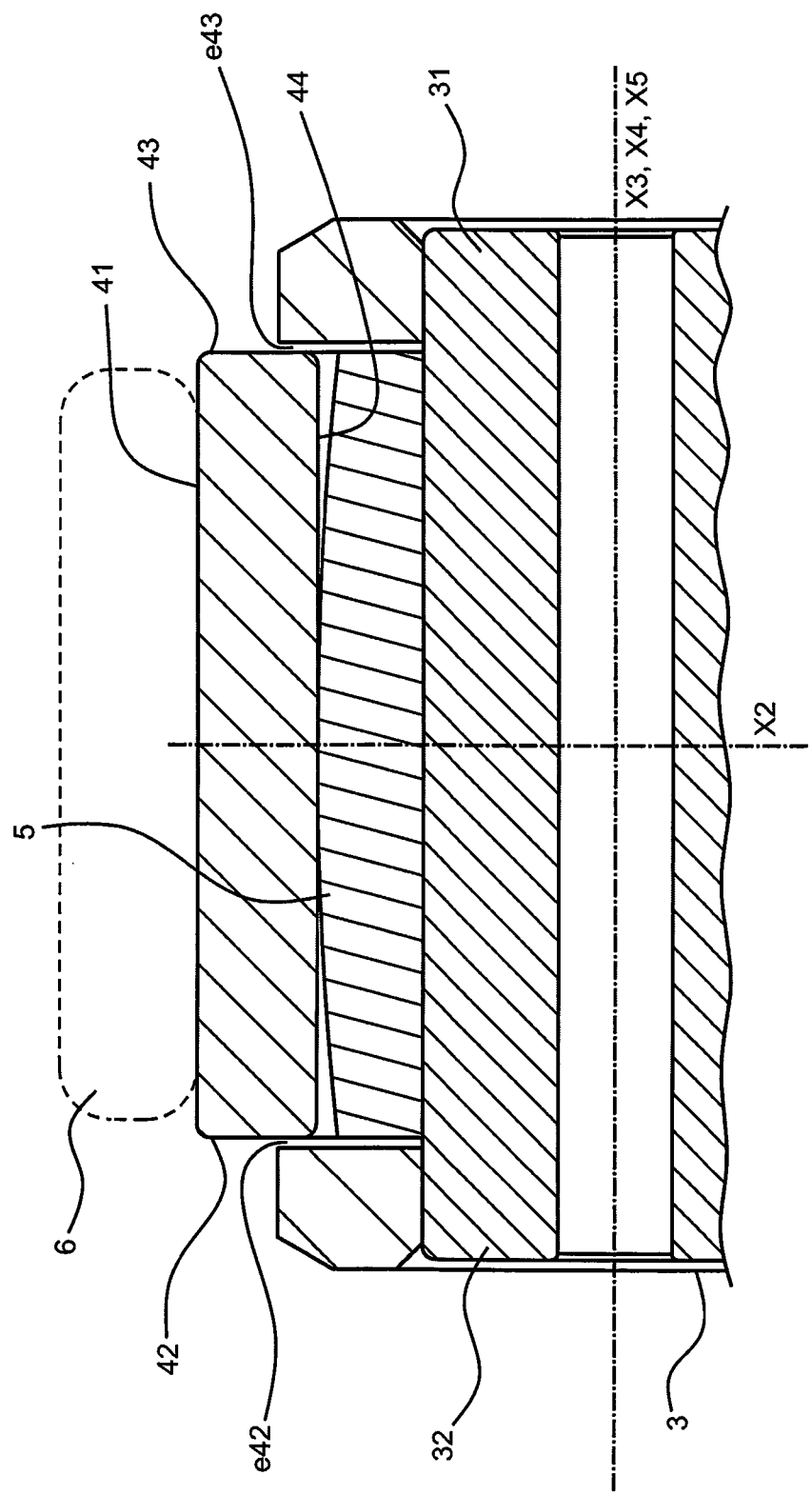

SELF-ALIGNING CAM FOLLOWER ROLLER DEVICE

CROSS-REFERENCE

This application claims priority to German patent application no. 102017212521.7 filed on Jul. 20, 2017, the contents of which are fully incorporated herein by reference.

TECHNOLOGICAL FIELD

The invention relates to a cam follower roller device used in automotive or industrial applications.

One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND

Such a cam follower roller device generally comprises an outer tappet body, a roller and a pin in bronze or steel. The roller is rotatably mounted on the pin so as to form a rolling assembly centered on a transverse axis, while the tappet extends along a longitudinal axis. Needles or a bushing may be longitudinally interposed between the roller and pin to ensure roller in rotation relative to the pin around its axis, or pin outer surface may be specifically coated to support direct rotation of roller. The tappet is formed with a cylindrical body delimiting an internal volume wherein are arranged the rolling assembly.

For example in EP-A1-2 960 446, DE-A1-10 2014 226853 or DE-A1-10 2010 033120, it is well known to provide tappet body with transverse through-holes transversally facing one another to receive ends of pin. Tappet body further comprises an inner axial bottom wall dedicated to support a piston in longitudinal movement.

It is also known from FR-A-2 946 406 to provide a support body within tappet body to support the rolling assembly, pin ends being supported by flanges of the support body.

The roller axially extends from the tappet so as to collaborate with a cam synchronized with the internal combustion engine camshaft or crankshaft. The rotation of the camshaft or crankshaft leads to a periodic displacement of a piston of the pump that rests against the tappet, to allow fuel to be delivered.

In operation, the tappet is intended to slide back and forth into a housing, such as a pump housing. Generally, there is an angular misalignment between the longitudinal axis of the tappet body and the axis of the associated housing. It induces a misalignment between the roller transverse axis and the housing tappet body longitudinal axis. Accordingly, edge stresses may occur at the ends of the roller of the device with the contact against the cam. Accordingly, in operation, the contact pressure between the roller and the cam may be increased.

SUMMARY

The aim of the invention is to overcome these drawbacks by proposing a self-aligning cam follower roller device having a design adapted to reduce stress edges on the roller in operation.

To this end, the invention relates to a cam follower roller device comprising a tappet body extending along a longitudinal axis and defining a tappet bore, a pin centered on a transverse axis, support means for mounting ends of pin on the tappet body, and a roller rotatably mounted on the pin around the transverse axis, the roller having a cylindrical outer surface, a central cylindrical bore and two frontal end faces.

According to the invention, transverse gaps are provided between frontal end faces of roller and tappet bore, and the central cylindrical bore of roller is mounted around an annular rolling surface of transverse convex profile.

Thanks to the invention, the axis of the roller may tilt relatively to the pin of fixed transverse axis. The roller is able to move angularly along the convex rolling surface relative to the pin and to the tappet body. The roller angular movement permits to accommodate angular misalignment between the axis of the tappet body and the axis of the housing into which is mounted the device, such as a pump housing. When such a tilting occurs, the angular movement of roller is allowed by the transverse gaps provided between roller and tappet bore. The edge stresses that may occur at the ends of roller with the contact against the associated cam is reduced. Accordingly, in operation, the contact pressure between the roller and the cam may be reduced.

According to further aspects of the invention which are advantageous but not compulsory, such a cam follower roller device may incorporate one or several of the following features:

The roller is directly mounted around pin, the pin comprising an outer surface forming the annular rolling surface of transverse convex profile.

The cam follower roller device comprises a sliding bushing interposed between central cylindrical bore of roller and an outer surface of pin, the sliding bushing comprising an outer surface forming the annular rolling surface of transverse convex profile.

The transverse convex profile of the annular rolling surface is logarithmic.

The tappet body comprises two transverse cylindrical through-holes transversally facing one another and receiving each an end of pin, the through-holes forming support means for the pin.

The tappet body comprises a support body fast in tappet bore, the support body comprising a transverse base and two longitudinal flanges that are transversally opposed and that extend longitudinally from the base, each flange comprising support means for receiving an end of pin.

Support means of flanges of support body consist in transverse cylindrical through holes.

Support means of flanges of support body consist in concave portions of semi-circular profile and open to upper side of the device.

The support body and tappet body comprise fixation means for fixing the support body in tappet bore.

The tappet body is made of a synthetic material, for example of polyamide or polyether-ether-ketone.

The tappet body is made of metal, for example steel.

The support body is made of metal, for example steel.

The invention also concerns an injection pump for a motor vehicle, equipped with a cam follower roller device as mentioned here-above.

The invention also concerns a valve actuator for a motor vehicle, equipped with a cam follower roller device as mentioned here-above.

BRIEF DESCRIPTION OF THE DRAWINGS

The invention will now be explained in correspondence with the annexed figures, as illustrative examples, without restricting the object of the invention. In the annexed figures:

FIG. 2a is a sectional view of a cam follower roller device with transverse gaps between frontal end faces of a roller and an inner wall of a tappet bore according to a first embodiment of the invention;

DETAILED DESCRIPTION

Figure 1:
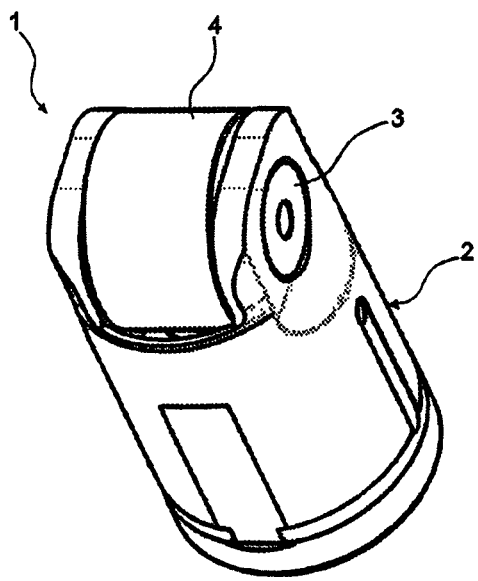
FIG. 1 is a perspective top view of a cam follower roller device.
Figure 2:
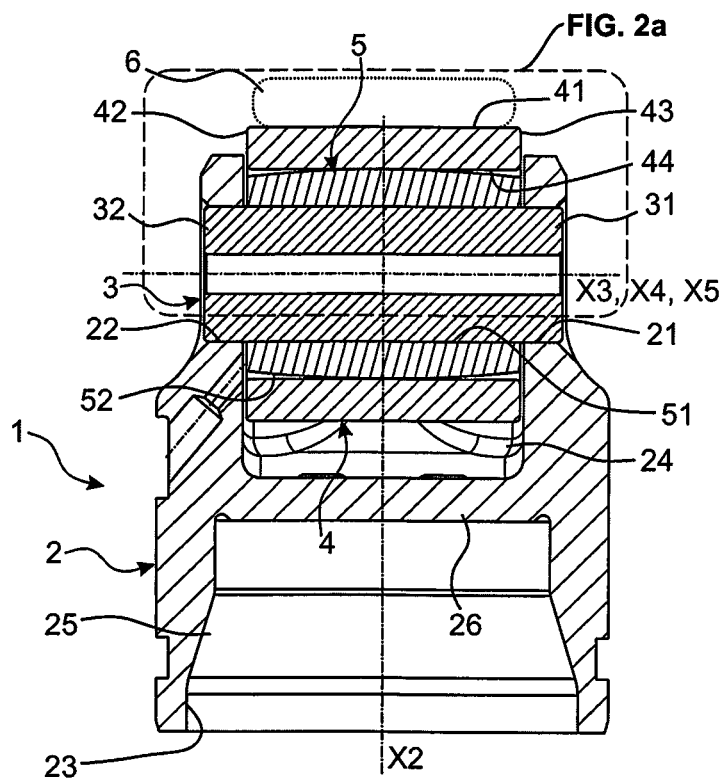
FIG. 2 is a sectional view of a cam follower roller device according to a first embodiment of the invention.

As shown on FIGS. 1 and 2, a cam follower roller device 1 comprises a tappet housing or body 1 extending along a longitudinal axis X2, a shaft or pin 3 extending along a transverse axis X3 perpendicular to the longitudinal axis X2, and a roller 4 with an axis X4 coaxial with the axis X3 in normal operation, the roller 4 being mounted on the pin 3 and movable in rotation relative to the pin. In the disclosed embodiment of FIG. 2, a sliding bushing 5 is longitudinally interposed between the roller 4 and pin 3.

Hereinafter, to facilitate the special identification of the device 1 for these figures and for the following ones, the adjectives "longitudinal" and "transverse" and the adverbs "longitudinally" and "transversally" are defined relative to the axis X2 and X3, respectively. Thus a longitudinal portion or part is parallel to the axis X3, whilst a transverse portion or part is perpendicular to the axis X2 and parallel to the axis X3.

In the disclosed example, the tappet body 2 is made in one part. The tappet body 2 delimits a tappet bore 23 with a first open cavity 24 inside which are located the pin 3, the roller 4 and the bushing 5. The roller 4 longitudinally protrudes outwards with respect to an upper face of tappet body 2 so as to collaborate with a cam 6 of an internal combustion engine (not shown). Tappet bore 23 defines a second open cavity 25 oriented axially on the side opposite to the first cavity 24. A movable element (not shown), such as a piston of a fuel injection pump, is intended to extend into cavity 25 and to axially bear against a rear abutment surface 26 of tappet body 2. The rear abutment surface 26 is oriented longitudinally on the side opposite to the roller 4. The rear abutment surface 26 is advantageously planar and extends transversally between inner walls in tappet bore 23, the rear abutment surface 26 longitudinally separating first and second open cavities 24, 25 being disposed on either side of the surface 26.

The tappet body 2 is movable back and forth substantially along the longitudinal axis X2, in a non-representing bore belonging to the injection pump or motor with outer surface of tappet body 2 sliding within the bore. Tappet 2 can be of synthetic material, for example Polyamide 6.6 (PA) or polyether-ether-ketone (PEEK), or made of metal, for example steel. Material of tappet 2 is chosen resistant to oil and its additives and temperature variations.

Referring to FIGS. 2 and 2a, pin 3 comprises two opposite pin ends 31, 32 ("pin ends" also referred to as "first and second pin axial ends") and a central portion extending between the pin ends. The tappet body 2 further comprises two cylindrical through-holes 21, 22 made through the thickness of the tappet body 2 and open into the first open cavity 24. The cylindrical through-holes 21, 22 transversally face one another. Pin ends 31, 32 are mounted in the through-holes 21, 22, respectively. Pin ends 31, 32 are fastened to tappet body 2 for example by welding, gluing, caulking or by any other suitable means.

In the first embodiment of the invention, the pin is transversally cylindrical around axis X3. The pin 3 defines a cylindrical outer surface supporting the sliding bushing 5, the sliding bushing 5 being annular and defining a central cylindrical bore 51 fit onto outer cylindrical surface of pin 3. Sliding bushing 5 is of transverse axis X5 coaxial with the axis X3 of pin 3. The roller 4 is directly mounted on the sliding bushing 5.

The roller 4 comprises a cylindrical outer surface 41 which forms a contact surface intended to bear against the associated cam 6, two frontal end faces 42, 43 transversally delimiting the outer surface 41, and a central cylindrical bore 44.

Transverse gaps e42 and e43 are provided between frontal end faces 42, 43 of roller 4 and inner wall of tappet bore 23.

According to the invention, the sliding bushing 5 comprises an outer rolling surface 52, the central cylindrical bore 44 of roller 4 being mounted onto the outer rolling surface 52, the outer rolling surface 52 being of transverse convex profile. The outer rolling surface 52 of sliding bushing 5 is in longitudinal line or contact surface with a portion of the central cylindrical bore 44 of roller 4.

Advantageously, the transverse convex profile of the outer rolling surface 52 is logarithmic. Alternatively, the profile can be of any other suitable convex shape.

When the longitudinal axis X2 of the tappet body 2 is aligned with the longitudinal axis of the bore belonging to the injection pimp or motor, the roller 4 rotates on the outer rolling surface 52 of sliding bushing 5. The axis X4 of roller 4 is coaxial with transverse axis X4 and X5 of pin 4 and sliding bushing 5, the axis X4 and X5 being coaxial in any case.

When the longitudinal axis X2 of the tappet body 2 is misaligned with the longitudinal axis of the bore belonging to the injection pump or motor, an angle being formed between the axis, the roller 4 still rotates on the outer rolling surface 52 of sliding bushing 5. The axis X4 of roller 4 is tilted with respect to the transverse axis X4 and X5 of pin 4 and sliding bushing 5. Accordingly, an angular tilting of the roller 4 with respect to the tappet body 2 is then obtained in this case. In particular, the axis X4 or roller 4 tilts angularly relative to the rear abutment surface 26 of tappet body 2 against which a movable element abuts and is set in back-and-forth motion.

Such tilting can be obtained since the transverse gaps e42 and e43 are provided between the roller 4 and the tappet bore 23 of body 2. The edges of roller 4 are substantially transversally moved in the free gaps e42 and e43, ensuring a certain freedom of tilting movement for roller 4.

When the cam follower roller device 1 is mounted into an associated housing, such as a pump housing, the roller 4 is able to move angularly relative to the tappet body 2 to accommodate angular misalignment between the axis of the housing and the axis X2 of tappet body 2. With a contact between roller 4 of device 1 and the cam 6 of an internal combustion engine, the roller 4 may tilt angularly relative to the tappet housing 2. This has the effect of reducing the edge stresses that may occur at the ends of roller 4. Accordingly, in operation, the contact pressure between the roller 4 and the cam 6 may be reduced.

Figure 3:
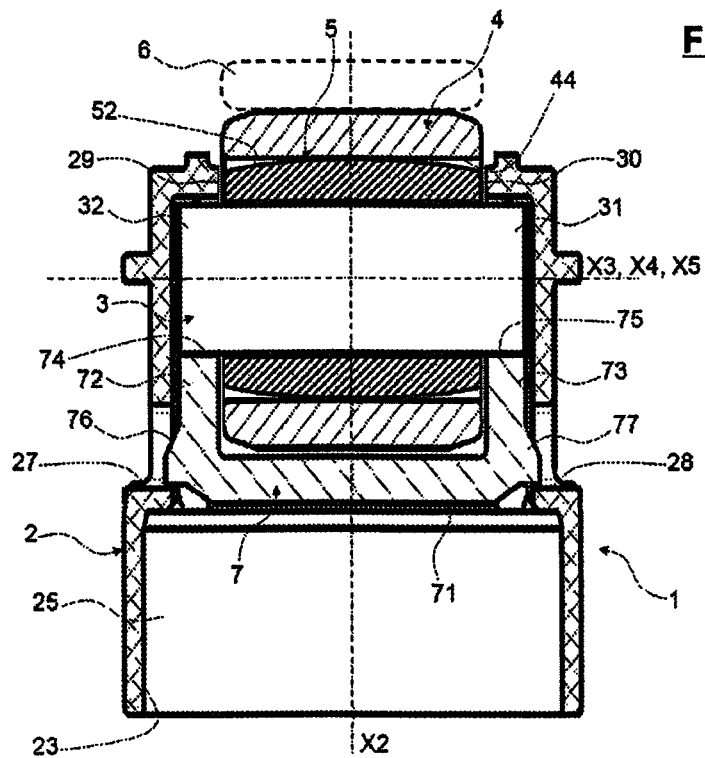
FIG. 3 is a sectional view of a cam follower roller device according to a second embodiment of the invention.

The second embodiment of the invention is illustrated on FIG. 3, in which identical parts are given identical references, and differs from the previous embodiment in that the tappet body 2 comprises a support body 7 forming a support element for pin 3, roller 4 and sliding bushing 5.

The support body 7 comprises a base 71 extending transversally, and two lateral flanges 72, 73 extending longitudinally from the base 71 towards the upper side of tappet body 2. Flanges 72, 73 are transversally opposite each other relative to the base 71. Support body 7 is fastened in tappet bore 23, base 71 forming a rear abutment surface for a movable element and separating the first and second open cavities. 24, 25.

Each of flanges 72, 73 comprises support means 74, 75 for pin ends 31, 32 of pin 3. In the present embodiment, the support means 74, 75 comprise a concave portion of semi-circular profile and open to the upper side of device 1. The portions 16, 17 are adapted to receive ends 31, 32 of pin 3. The profile of the concave portions 74, 75 fit with the cylindrical ends 31, 32 of pin 3.

Tappet body 2 further comprises longitudinal retention means 29, 30 formed by transverse portions inwardly extending from the upper side of the tappet body 2 towards roller 4. The transverse portions 29, 30 are transversally opposed each other, and longitudinally cover ends 31, 32 of pin 3 so as to prevent any dismounting of the pin 3 from the upper side of the first open cavity 24 of tappet body 2.

As an alternate not shown, the support means of flanges 72, 73 may comprise each a cylindrical bore wherein is inserted an end of pin.

The support body 7 and the tappet body 2 comprise fixation means to fix the support body 7 in tappet bore 23. Flanges 72, 73 of support body 7 are each provided with transversally outwardly projecting portions 76, 77 towards inner walls of tappet bore 23. Tappet body comprises through-windows 27, 28 provided through the thickness of tappet body 2. The projecting portion 76, 77 of support body 7 are clipped with the through-windows 27, 28 of tappet body 2. As an alternate not shown, the support body may be welded, overmoulded, glued with tappet body, or comprising fixation means of any other suitable means.

In this second embodiment, the arrangement of pin 3, sliding bushing 5 and roller 4 is identical to the first embodiment.

Figure 4:
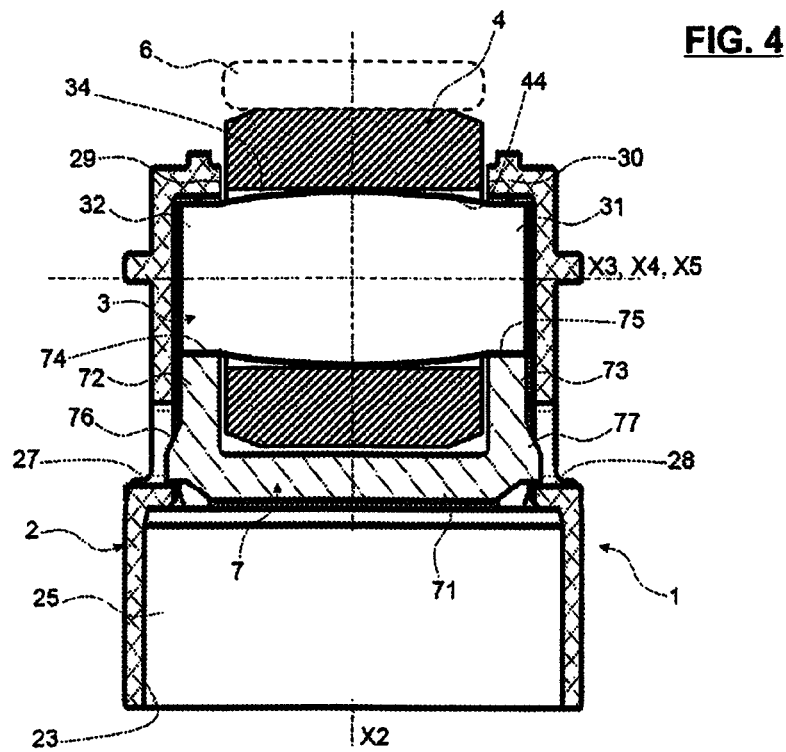
FIG. 4 is a sectional view of a cam follower roller device according to a third embodiment of the invention.

The third embodiment of the invention is illustrated on FIG. 4, in which identical parts are given identical references, and differs from the previous embodiment in that the roller 4 is directly mounted onto the pin 3.

The pin 3 comprises two opposite pin ends 31, 32 and a central portion extending between the pin ends. Pin ends 31, 32 are cylindrical and are mounted in support means 74, 75 of flanges 71, 72 of support body mounted in tappet bore 23. The central portion between the two cylindrical pin ends 31, 32 defines an outer rolling surface 34, the central cylindrical bore 44 of roller 4 being mounted onto the outer rolling surface 34, the outer rolling surface 34 being of transverse convex profile. The outer rolling surface 34 of pin 3 is in longitudinal line or contact surface with a portion of the central cylindrical bore 44 of roller 4.

Advantageously, the transverse convex profile of the outer rolling surface 34 is logarithmic. Alternatively, the profile can be of any other suitable convex shape.

The present invention has been illustrated on the basis of a cam follower roller device which can for example be used in a fuel injection pump intended for an internal combustion engine. It is also possible, without departing from the scope of the invention, to provide a cam follower roller device in a rocker system which is used for the control of valves of an internal combustion engine.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependent claims below, may be combined in ways that are not specifically and explicitly enumerated in order to provide additional useful embodiments of the present teachings.

What is claimed is:

1. A cam follower roller device comprising:
a tappet body extending along a longitudinal axis and having an inner surface defining a tappet bore, the tappet body having a first tappet body opening and a second tappet body opening located along the longitudinal axis, the tappet body defining a first tappet body through window and a second tappet body through window,
a pin centered on a transverse axis and having a first pin axial end and a second pin axial end,
a support body disposed within the tappet bore, the support body comprising a base, a first lateral flange, and a second lateral flange, the support body being positioned in the tappet body to separate the roller from an open cavity configured to receive a moveable element therein, the first lateral flange supporting the first pin axial end and the second lateral flange supporting the second pin axial end, the second tappet body opening being configured to allow the moveable element therethrough for positioning in the open cavity,
wherein the support body further comprises a first transversely outwardly projecting portion located on the first lateral flange and extending into the first tappet body through window, a second transversely outwardly projecting portion located on the second lateral flange and extending into the second tappet body through window,
a roller rotatably mounted on the pin around the transverse axis, the roller having a cylindrical outer surface, a central cylindrical bore and two frontal end faces, a portion of the roller extending through the first tappet body opening,
transverse gaps provided between frontal end faces of the roller and the inner surface of the tappet body, the central cylindrical bore of the roller being mounted around an annular rolling surface of transverse convex profile.

2. The cam follower roller device according to claim 1, wherein the roller is directly mounted around the pin, the pin comprising an outer surface forming the annular rolling surface of transverse convex profile.

3. The cam follower roller device according to claim 1, wherein the cam follower roller device further comprises a sliding bushing interposed between central cylindrical bore of roller and an outer surface of pin, the sliding bushing comprising an outer surface forming the annular rolling surface of transverse convex profile.

4. The cam follower roller device according to claim 1, wherein the transverse convex profile of the annular rolling surface is curved.

5. The cam follower roller device according to claim 1, wherein the pin does not extend through the tappet body.

6. The cam follower roller device according to claim 1, wherein a support means of the flanges of the support body are provided within concave portions of semi-circular profile and are open to an upper side of the device.

* * * * *